(12) United States Patent
Emde

(10) Patent No.: US 7,347,608 B2
(45) Date of Patent: Mar. 25, 2008

(54) WINDOW ELEMENT

(76) Inventor: Thomas Emde, Friedberger Landstrasse 645, 60389 Frankfurt /Main (DE)

( * ) Notice: Subject to any disclaimer, the term of this patent is extended or adjusted under 35 U.S.C. 154(b) by 0 days.

(21) Appl. No.: 10/502,801

(22) PCT Filed: Feb. 7, 2003

(86) PCT No.: PCT/EP03/01236

§ 371 (c)(1),
(2), (4) Date: Jan. 6, 2005

(87) PCT Pub. No.: WO03/067014

PCT Pub. Date: Aug. 14, 2003

(65) Prior Publication Data

US 2005/0105303 A1    May 19, 2005

(30) Foreign Application Priority Data

Feb. 9, 2002    (DE) ............................... 102 05 405

(51) Int. Cl.
*F21V 7/04* (2006.01)
(52) U.S. Cl. ................. 362/604; 362/84; 362/234; 362/311
(58) Field of Classification Search ............... 362/602, 362/311, 604, 354, 84, 251, 800, 812, 234; 40/546
See application file for complete search history.

(56) References Cited

U.S. PATENT DOCUMENTS

| | | | | |
|---|---|---|---|---|
| 1,843,980 A | * | 2/1932 | Hotchner | 40/546 |
| 1,930,359 A | * | 10/1933 | Hilgenberg | 40/442 |
| 2,072,454 A | * | 3/1937 | Jackson | 40/546 |
| 4,645,970 A | * | 2/1987 | Murphy | 313/509 |
| 4,749,261 A | * | 6/1988 | McLaughlin et al. | 349/16 |
| 5,469,020 A | * | 11/1995 | Herrick | 313/511 |
| 5,743,616 A | * | 4/1998 | Giuliano et al. | 362/612 |
| 5,940,150 A | * | 8/1999 | Faris et al. | 349/16 |
| 6,185,883 B1 | * | 2/2001 | Howard | 52/204.59 |
| 6,801,185 B2 | * | 10/2004 | Salley | 345/102 |

FOREIGN PATENT DOCUMENTS

| | | |
|---|---|---|
| DE | 3822796 | 10/1989 |
| DE | 4228927 | 10/1993 |
| DE | 4408824 | 6/1995 |
| DE | 19529737 | 12/1996 |
| DE | 19922973 | 12/2000 |

* cited by examiner

*Primary Examiner*—Sandra O'Shea
*Assistant Examiner*—Gunyoung T. Lee
(74) *Attorney, Agent, or Firm*—Hoffman, Wasson & Gitler

(57) ABSTRACT

The invention relates to a window element (10), comprising at least one at least periodically transparent sheet-like element (11) and at least one surface (display) for replay of images, whereby the sheet-like element comprises at least one display (12) which is part of the sheet-like element. In a first state with an operating display a replay of image elements occurs on the sheet-like element and in a second state with a switched-off display a view through the sheet-like element is at least partly possible.

18 Claims, 2 Drawing Sheets

Fig. 1
Fig. 2
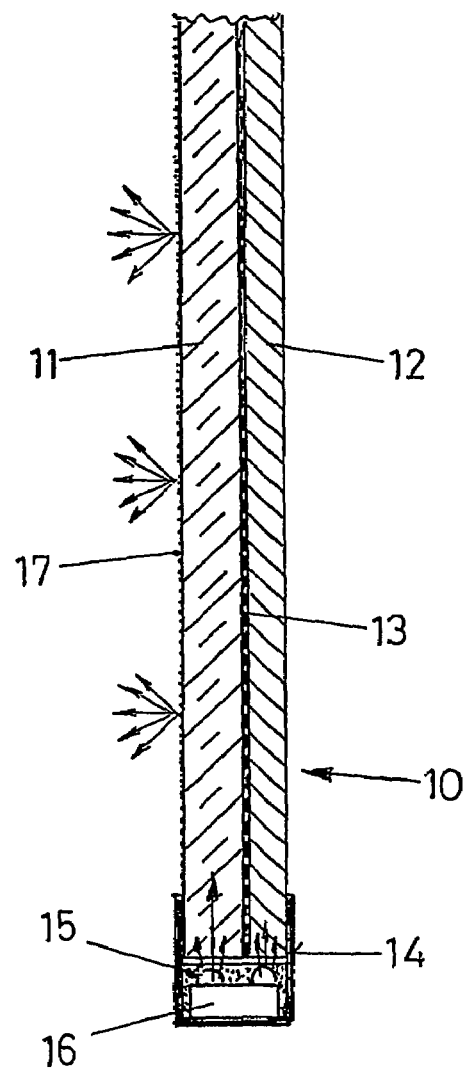
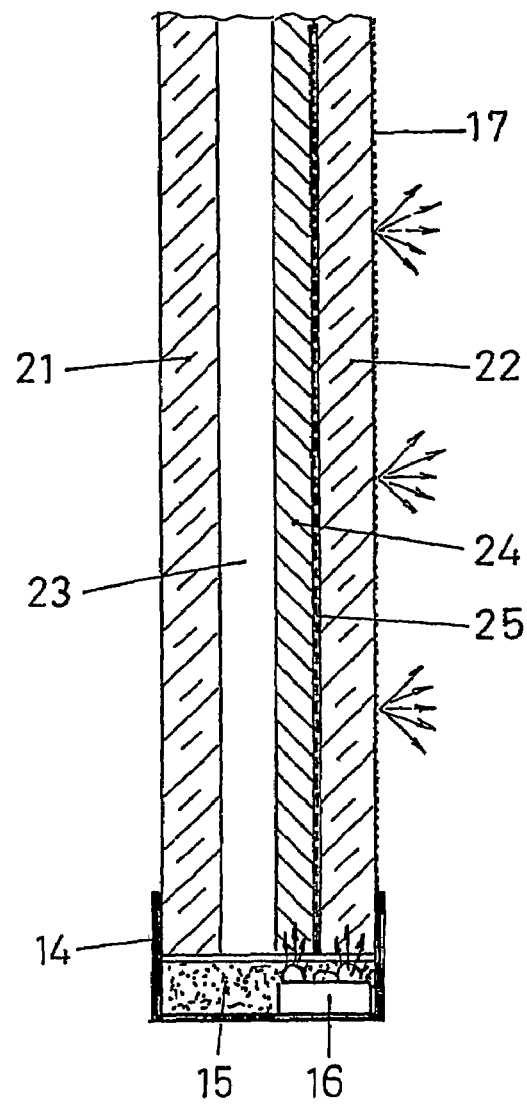

WINDOW ELEMENT

BACKGROUND OF THE INVENTION

The present invention relates to a window element comprising at least one at least periodically translucent sheet-like element and at least one surface (display) intended for the reproduction of images.

According to the prior art, conventional screens (information carriers) are separate objects on which the reproduction of images is carried out in accordance with the cathode ray tube principle. In recent times, use has increasingly been made of flat screens, which take up less space and appear more elegant than conventional monitors. However, even these flat screens are separate objects.

In DE 101 31 598 C1, which was filed on Jun. 29, 2001 but is not a prior publication as compared with the present application, a description is given of using a sunshade as a display, so to speak, by the hanging surface being provided with organic light-emitting diodes (OLED) and these being driven via control electronics in order in this way to produce an image on the sunshade hanging. However, the sunshade hanging is not translucent but, instead, is used for the purpose of shielding an interior space against solar irradiation. This is therefore a sight screen in the form of an awning, a set of louvers, a roller blind, a roller shutter or the like. It is therefore only possible either to pull the sunshade down or forward and then to use it as a display for viewing images or the sunshade hanging is pulled up or to the side and then, when the latter is located in front of a window, it is possible to look out through the window. However, the screen is then no longer visible and usable. In the case of this idea, an additive element is used in every case, which constitutes the sunshade hanging, in order to permit images to be viewed. This has the disadvantage that the user must purchase the additive element and that he must pull this additive element down or forward in order to use it as a screen.

It is also already known to coat glass panes, which are either suspended freely in the room or are part of windows or shop windows, with a special prismatic film, in order then to project images onto these glass panes. For this purpose, however, a separate projector is needed. This means that the image is generated by the projector and not in the display or in the immediate vicinity of the display, as in the case of a flat screen. In this method, the projected image floats, so to speak, on the glass pane. The distortion caused by the projection has to be compensated for.

On the basis of this prior art, the object of the present invention is to provide a window element which, firstly, as required, is used in a function as a window and is thus largely transparent and which, in another function as an alternative to this, can be used as a display for the reproduction of image elements but without a projection device being needed for this purpose.

The achievement of this object supplies a window element according to the invention of the generic type cited at the beginning and having the characterizing features of the main claim.

SUMMARY OF THE INVENTION

According to the invention, provision is made for the sheet-like element or at least one sheet-like element of a window element to comprise at least one projector-independent image-generating display which is part of the sheet-like element, reproduction of image elements on the sheet-like element being carried out in a first state with the display switched on and, in a second state with the display switched off, a view through the sheet-like element being at least partly possible.

According to the invention, the display itself thus generates image elements or these are generated in the display and not merely projected onto a reproduction surface by means of a projector or the like.

The present invention therefore departs from the idea of using an additive element which is then used as a display. Instead, a window element, which can also already be present, is in itself used as a display. If it is a window element which is part of a window in the real sense, the window element is therefore already present and, in the second state with the display switched off, fulfils its usual window function, that is to say it is possible to look through it. Under certain circumstances, the viewer does not perceive that this is a display. If the window element is intended to be used as a display, it is sufficient to "switch on" the display, so to speak, that is to say to transfer it into a switched-on state in which it automatically reproduces images, that is to say without a projector additionally being necessary.

It should be emphasized at this point that, under a window element according to the present invention, it is not to be understood exclusively that this is part of a window. Instead, numerous other objects which have at least one window element according to the present invention can be considered. A window element according to the invention can be incorporated into a facade, wall, ceiling or the roof of a building. In this case the window element forms a window or part of a window in the widest sense. However, the window element can equally well be incorporated in the interior area of a building, for example as a part of a dividing wall or a door or staircase or an elevator, an escalator, a railing, for example a railing of an escalator or of a traveling pavement. In this case, too, there is the advantage that the object that is transparent in the usual state, that is to say with the display switched off, or at least transparent objects in the region of the window element fulfill their actual conventional function, for example the function of a transparent dividing wall or door or that of a transparent elevator (glass elevator), of a transparent railing (glass railing) and so on. The special feature of the idea according to the invention therefore consists in an object that is transparent or is transparent in subareas in a usual state firstly maintaining its previous function but, in a second state, itself becoming a screen without changes having to be made to the object (apart from changing the switching state) and without an additive element being necessary, as in the prior art cited at the beginning. The great advantage in this case is that a transparent layer of the object is already present and can be used as a carrier for display elements such as OLEDs or the like.

A window element in the sense of the present invention can, for example, also be part of a piece of furniture, municipal furniture, garden furniture or the like. In this variant, too, use is again made of the fact that the object itself is already transparent, at least in subareas, in a usual state and initially fulfils its conventional function. The object can be, for example, a glass table or a table made of another material with a glass plate incorporated. The object can also be a glass cabinet or partially glass cabinet and so on. Such a table with a glass plate can therefore be used like a conventional glass table. However, the fact that the glass plate or part thereof is formed by a window element according to the invention means that the table can also be used as a display in the region of the window element. This makes it possible, for example, for a person seated at such a glass table to carry out any kind of desired routine, for example to eat a meal and, at the same time, to use the region of the glass table which is formed as a window element in the sense of the invention, this can also be the entire glass table, for viewing images, for example as in the case of a television set or else as a computer monitor. An additive screen is therefore no longer needed. Furthermore, according to the invention, it is advantageous that the elements and/or layers otherwise necessary to the image generation no longer have to be applied to an additional carrier layer. Instead, the object itself can if appropriate serve as the carrier layer.

The aforementioned display, according to a preferred variant of the present invention, can preferably be an intrinsically flexible flat display applied for example to the sheet-like element or accommodated in the sheet-like element. According to a first simple variant of the invention, the sheet-like element is a panel, preferably made of glass or plastic glass, to which a flexible flat display is applied flat to one side, for example by adhesive bonding, welding on or the like. The sheet-like element of the invention can, however, also be a multilayer composite panel, a flexible flat display, for example, being applied to one side of such a composite glass panel or such a flat display being fitted between two panes of such a composite glass or such a composite plastic panel. According to a further variant of the invention, the sheet-like element can also be an insulating glass pane or an insulating plastic glass pane having a plurality of glass panes, for example spaced apart from one another (for example double or triple glazing), a flexible flat display preferably being applied to a side of one of the glass panes facing the interspace. In the case of this arrangement, there is the advantage that the flat display is protected against mechanical influences and weathering effects, since it is located on an inner side of the sheet-like element. The same advantage exists in the case of a composite arrangement of a multilayer sheet-like element in which a flat display is arranged on the inside between two panes of the composite arrangement.

Suitable for a display according to the invention is, for example, an electroluminescent display (ELD), which is largely transparent when switched off. Also suitable are LCD displays, plasma displays (PDP), vacuum fluorescence displays (VFD), field emission displays (FED), LED or OLED displays. In this case, the display largely permits the view through or the passage of light, so that the window element can be used in its window function as such and the display is in principle not perceived at all or barely perceived by the viewer. When the electroluminescent display is switched on, on the other hand, the window element is used as a screen for the reproduction of image elements toward one side or the other, that is to say toward the interior in the case of a window of a building or also toward the exterior, the image elements appearing on the sheet-like element when the display is switched on and a view through not being possible or possible only to a restricted extent. This use of the display function is of course predominantly recommended during darkness. In the solution according to the invention, the possibility of a sight screen with respect to the outside or with respect to the inside is already provided by the display function of the window element without venetian blinds, roller blinds or similar additive elements being needed.

Suitable displays for the application according to the invention have recently been disclosed by the specialist literature, for example, if organic light-emitting diodes (OLEDs) are used, a multilayer structure of the display is suitable which comprises a transparent electrode, for example made of ITO (indium tin oxide) and a layer of a light-emitting material, for example an organic polymer. OLEDs of this type are described, for example, in DE 100 45 204 A1, which was filed on Sep. 13, 2000 and is not a prior publication as compared with the present application. Displays of this type are cited here only by way of example since, within the scope of the present invention, other types of image-generating elements can be used equally well.

One development of the invention provides for the window element to further comprise an illuminating device having at least one light-emitting means which is suitable to radiate light into the sheet-like element at the end, the sheet-like element being formed on its surface or in its interior to scatter light in such a way that the light is deflected substantially perpendicular to its irradiation direction and is output via the surface of the sheet-like element, at least toward one side. In this development, the window element permits a third function, namely the illuminating function, in which the sheet-like element or elements appear to be self-luminous, so to speak, and output light to the outside and/or to an interior room if it is, for example, a window element of a building. If this third function (illuminating function) is present, the following possibilities are therefore obvious. During the day, the window element can be largely transparent in the unilluminated state and can permit the incidence of daylight, for example into the interior of a building, like a conventional window. With increasing darkness, the illuminating function can be used, the light-emitting means being switched on and the window element appearing to be luminous, the view into the building from outside then generally likewise no longer being possible. In this case, however, as a result of the type of illumination according to the invention with irradiation of light into the sheet-like element at the ends and with deflection, such that the output of light is provided by scattered light via the surface of the window element, the situation is achieved where an actual light-emitting means is not visible to the viewer, instead the window element appears to be intrinsically self-luminous. Finally, the third function can be used, in which the display is operated and the window element is used for the flat reproduction of image elements. This third function can be used, for example, for viewing images or films. This can be carried out, for example, from within the building and has the substantial advantage that the viewer uses the window element as a screen and does not need a separate screen. A projector is likewise not necessary, and equally nor is a projector screen or a conventional large-area flat screen according to the prior art. The previously known large-area flat screens are very costly, as is known. Instead, according to the invention, the viewer for example views a film by simply looking at the window element. If there is a plurality of window elements of this type, both the location and the size of the display on which the images are viewed can thus be varied. For example, it is possible to use an entire facade of a building or parts thereof as a screen. The facade itself therefore becomes the screen. After the display function has been switched off, in the evening, for example, the viewer can simply switch the window element to the "illumination" function. Switching off the illuminating function and thus changing the function into a conventional window element can be carried out automatically by means of appropriate control devices, for example at daybreak.

According to a development of the invention, provision is made for the window element to preferably comprise at least one frame construction, which encloses a sheet-like element or a plurality of sheet-like elements arranged in an assembly at the edge. In this case, provision is preferably made for the frame construction to largely cover the light-emitting means radiating into least one sheet-like element at the ends, as viewed in the direction of the surface normal of the sheet-like elements. As a result, a glaring effect on the viewer is prevented, since the light-emitting means radiating into the sheet-like element at the end cannot be seen immediately by the viewer.

For the operation of the display, there are preferably control devices and, likewise, there are preferably also control devices for the control of the light-emitting means, in particular to permit periodic and/or color control of the light-emitting means. This results in further possibilities, for example by the illumination being carried out with colored light, it being possible for the color to be varied. Window elements of this type appearing to be illuminated in color can be used, for example, for visually pleasing styling of a building facade. Suitable light-emitting means which permit such colored illumination, which varies if appropriate, in a technically relatively simple manner are preferably light-emitting diodes, for example LEDs or the like. Light-emitting diodes of this type can be arranged in what is known as the RGB (red-green-blue) mode and appropriately driven electronically.

Further control devices for the light-emitting means can comprise, for example, movement detectors or other sensors for switching on the illumination on the approach of a person, or brightness control can be provided, depending on the existing daylight or extraneous light or, if appropriate, a dimmer function. In addition, it is possible to switch the illuminating function in accordance with any desired pre-defined program, for example via a timer circuit with repeating switching rhythm and, if appropriate, additional switching operations such as a vacation function, absence, weekend switching and the like.

A window element according to the invention can be part of a facade, a wall or a ceiling of a building. The window element can also be a door, a dividing wall or part thereof or part of a piece of furniture or of municipal furniture, for example a park bench, or garden furniture.

A further preferred variant of the invention provides for the display according to the invention to be controllable, such that the viewing of images can optionally take place in each case from one side or the other of the window element as required. For example, in the case of window elements which are integrated in building walls, it is then possible to generate an image to be viewed from the inside, for example when the person present in the building would like to view a film. In another mode, by means of the same display on the same window element, it is then possible to generate an image that can be viewed from outside, so that, for example, the area of the window element on the building can be used for advertising purposes. Such a double use is, by contrast, not possible in the case of a display on an additive element such as a sunshade roller blind, since the latter is not transparent when the display is switched off. It is therefore possible for the image-generating layer to be applied only either to the inside or to the outside of the sunshade roller blind and, when the roller blind is pulled down, to use it only in one way or the other. By contrast, the solution according to the invention has a substantial advantage.

A preferred development of the invention provides for the display to comprise an intermediate layer, which can be switched from a transparent state to an opaque or reflective state. This variant makes it possible, for example, to view an image from the inside of the window element, said image being invisible from the outside if the intermediate layer is switched to be reflective or opaque. On the other hand, if the intermediate layer is switched to be transparent, the image could be viewed from the outside. If, for example, two such intermediate layers are used, once more in the case of only one display, an image that can be viewed optionally either from outside or from inside can be generated in the manner outlined previously, given appropriate switching of the intermediate layers.

The invention also has the advantage that the carrier used in the image-generating layer (the display) can also be structural glass known per se. Structural glass of this type is available in an extremely wide range of variants with additional functions which, for example, result from diverse coatings. For example, it can be structural glass with additional solar protection, with a coloration or the like. Such structural glass is then used as a carrier and the appropriate display layers are applied to it. In this case, there is the advantage that the initial structural glass can be obtained economically, it being possible for functions already present to be used for specific intended applications. The application of the display according to the invention, for example to this structural glass, can be carried out by adhesive bonding, for example of a film. However, it is also possible to use the structural glass directly as a carrier and to apply a display layer to this in another way, for example by spraying on, by vapor deposition, by printing on (for example screen printing) or by means of other coating processes.

According to a development of the invention, a display according to the invention which is present as a prefabricated flexible flat display and, for example, is applied to a glass layer, can itself have a plastic carrier or a glass carrier with a very thin layer. Very thin flexible glass layers have recently become available.

However, it is also possible to apply one or more protective layers over the layer or the layers with the image-generating function (display layer), it being possible for such a protective layer to have a very low layer thickness, which can be extremely thin, for example in the submicron range or in the nano range. Appropriate nano layers of suitable transparent materials and methods for their application are known. However, if a window element of composite glass is used, it is also possible to dispense with such a protective layer, since the image-generating layers (display layers) can then be located between two glass layers and, as a result, in any case are already protected by the outer glass layer against possible damage, weathering effects, atmospheric humidity, etc.

The features cited in the subclaims relate to preferred developments of the achievement of the object of the invention. Further advantages of the invention emerge from the following detailed description.

BRIEF DESCRIPTION OF THE DRAWINGS

In the following text, the present invention will be described in more detail using exemplary embodiments and with reference to the appended drawings, in which:

FIG. 1 shows a section through a window element according to the invention according to a first design variant of the invention;

FIG. 2 shows a section through a window element according to a second design variant of the invention;

DETAILED DESCRIPTION OF THE INVENTION

Figure 3:
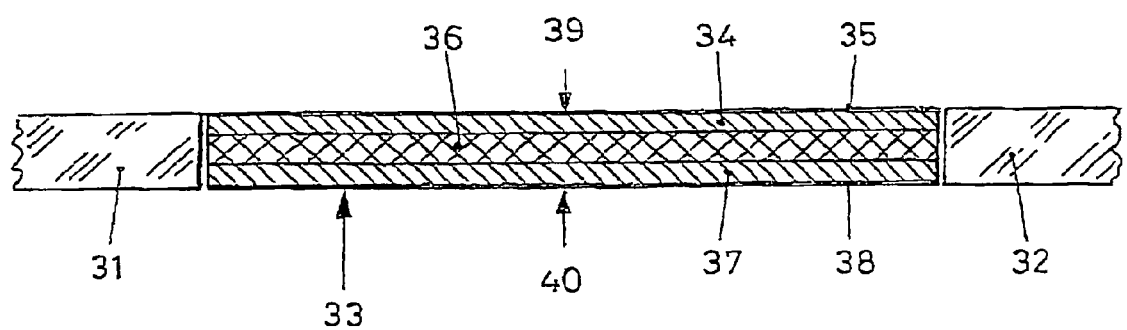
FIG. 3 shows a section through a window element according to a third exemplary design variant of the invention.

First of all, reference will be made to FIG. 1. The illustration shows a window element 10 according to the invention, which comprises a sheet-like element 11 made of glass or plastic glass, to which a flat display 12, which is preferably flexible before the application, is applied flat. The flat display 12 is, for example, bonded by means of an adhesive layer 13 onto a surface of the sheet-like element 11. The arrangement is enclosed at the ends by an approximately U-shaped frame profile 14, a light-emitting diode 16, for example an LED or the like, being placed in front of the end of the sheet-like element 11 and of the display 12 as a light-emitting means, it being possible for the light-emitting means 16 to be potted in a substantially transparent plastic strip 15. The light-emitting means 16 outputs its light at the end, so that light is radiated into the sheet-like element 11, that is to say into the glass pane, at the end. Since the sheet-like element 11 is printed or etched in a dot pattern 17 on at least one surface, for example on the outer surface, the light is scattered and leaves the sheet-like element 11 as scattered light substantially perpendicular to the radiation direction, that is to say the light is emitted over the surface of the sheet-like element 11, so that the latter appears to be two-dimensionally bright when the light-emitting means 11 is switched on.

FIG. 2 shows a longitudinal section through a window element according to a second alternative variant of the invention. In this case, the window element 20 is constructed in principle like an insulating glass pane having two sheet-like elements 21, 22 made of glass or plastic glass, which are spaced apart from each other, so that the result is an interspace 23 between these, which is generally filled with a gas. The flexible flat display 24 is applied to one side of one of the two sheet-like elements 22, for example by means of adhesive bonding. The adhesive layer between the flat display 24 and the sheet-like glass element 22 is designated 25. Here, too, one of the two sheet-like elements 22 is printed or etched or coated with a dot pattern 17 or the like, for example on its surface. Fitted at the end in front of the sheet-like element 22 and the flat display 24 is a light-emitting means 16, which again can be potted in a transparent plastic strip 15. As a rule, use is made of LEDs, of which a number are arranged one after another in a row, that is to say into the plane of the drawing in the illustration according to FIG. 1 or FIG. 2, so that the light is radiated in over the length of the end of the sheet-like element and is carried in the latter, in order then to be output to the outside as scattered light via the surface of the sheet-like element 22 on account of the dot pattern 17. This insulating glass pane arrangement with the two sheet-like elements 21, 22 and the flat display 24 is in turn enclosed by a U-shaped frame profile 14, for example, which also covers the light-emitting means 16 with respect to the outside, so that the view of the light-emitting means is not immediately possible and glare is ruled out. In addition, the impression of the use of discrete light-emitting means is avoided as a result, so that, instead, the entire sheet-like element 22 appears to be illuminated two-dimensionally.

In the following text, reference will be made to FIG. 3 and, by using this drawing, a further design variant of the present invention will be described. The illustration shows, by way of example, a section through a detail through a window element having image-generating layers. In the exemplary embodiment, the image-generating window element, which is designated overall by 33, is, for example, let into a glazed dividing wall, the conventional glass of the dividing wall adjoining on the right and left being designated 31 and 32, respectively. The region of the window element 33 has, for example, a rectangular outline and, when the display is switched off, is just as transparent as the adjacent regions 31, 32, so that a person viewing the dividing wall in principle does not perceive at all or barely perceives the window element 33 formed as a display. By contrast, when the display is switched on, it is possible to depict images, which can be viewed either from one side or the other side, on the region of the window element 33. This is to be explained in more detail below using the layered structure of the window element 33.

The dividing wall 31, 32, 33 is intended to be, for example, a dividing wall between two rooms 39, 40. On one side, the window element 33 comprises an external protective layer 34, which is used for protection against damage and other damaging influences such as atmospheric humidity and so on. This protective layer 34 can be very thin and, for example, can be a glass layer or another transparent layer with a layer thickness in the nano range. Underneath this protective layer 34 there is the actual image-generating layer 35, which can be built up in many layers but which is not illustrated in the drawing, for the purpose of simplification. This image-generating layer 35 is followed by an intermediate layer 36, which is again adjoined on the other side by an image-generating layer 37. Finally, on the side facing the room 40, an external terminating protective layer 38 is also provided, which can be formed in a manner similar to the protective layer 34 on the side facing the room 39. The two image-generating layers (display layers) 35, 37 can in principle also be configured identically, it being important that these layers are substantially transparent when the display is switched off. Between the two image-generating layers 35, 37 there is the intermediate layer 36, which can be changed into a switched-off state, in which it is likewise transparent. In a switched-on stage, on the other hand, the intermediate layer 36 acts either as an opaque layer or as a reflective layer. This makes it possible to switch on the image-generating layer 35 on one side and to generate an image which is emitted toward the room 39 but which, because of the opaque or reflective intermediate layer 36, cannot be detected from the room 40. As a result, it is also conversely possible to switch the intermediate layer 36 to be opaque or reflective and to generate an image by means of the image-generating layer 37, which image can be viewed from the room 40 but is not visible from the room 39. If both image-generating layers 35, 37 are switched off, the intermediate layer 36 can be switched to be transparent and the entire window element 33 then becomes transparent and the glazed dividing wall acts like a standard glass wall into which the window element 33 is integrated. Of course, such a glazed dividing wall can have a plurality of the window elements 33 of the type described previously, so that different images can be generated simultaneously at different points. In addition, it is also possible, given an intermediate layer 36 switched to be transparent or reflective, to view different images simultaneously from the room 39 and from the room 40 on the image-generating layers 35 and 37, respectively.

As an alternative to this, for example, it is possible to operate with only one image-generating layer, but for this purpose to apply intermediate layers to this on both sides in each case. In this case, given appropriate switching of the intermediate lawyers to be transparent or, respectively, opaque or reflective, it is possible to view an image optionally from the one room 39 or from the other room 40 on the one image-generating central layer if, in each case, one intermediate layer is then switched to be transparent and the other intermediate layer is switched to be opaque. In this variant, however, otherwise than described previously, it would not be possible to view different images simultaneously from both rooms, but there would be the advantage of managing with only one image-generating layer.

What is claimed is:

1. A window element comprising
at least one sheet element and at least one surface intended for the reproduction of images,
wherein the sheet element comprises at least one projector-independent image-generating display,
the image-generating display is an organic light emitting diode display,
reproduction of image elements on the sheet element is carried out in a first state with the image-generating display switched on, and
the sheet element of the window element is transparent in a second state with the image-generating display in a switched-off state,
an illuminating device with at least one light-emitting means to radiate light suitably into an edge of the sheet element,
wherein the sheet element scatters light in such a way that the light of the light-emitting means is deflected substantially perpendicular to the irradiation direction from the at least one light-emitting means and is output via the surface of the sheet element, at least toward one side.

2. The window element as claimed in claim 1, wherein the display is an intrinsically flexible flat display applied to the sheet element or accommodated in the sheet element.

3. The window element as claimed in claim 1, wherein the window element is a composite element having a plurality of sheet elements in the composite.

4. The window element as claimed in claim 1, wherein the window element comprises at least one composite element comprising a plurality of sheet elements, of which at least one is a glass plate or plastic glass plate, into which light is radiated at an end via light-emitting means and of which at least one sheet element is a flat display.

5. The window element as claimed in claim 1, wherein the window element comprises at least one composite element with at least two largely translucent sheet elements, between which a flat display is embedded.

6. The window element as claimed in claim 1, wherein the window element comprises at least one frame construction which encloses a sheet element or a plurality of sheet elements arranged in a composite at one or more edges or peripherally at the edge.

7. The window element as claimed in claim 1, wherein a frame construction largely covers a light-emitting means radiating into at least one sheet element at an end, as viewed in the direction of the normal to the surface of the sheet elements.

8. The window element as claimed in claim 1, wherein the window element further comprises control devices for the operation of the display and/or for the control of a light-emitting means, in particular periodic and/or color control of the lightemitting means.

9. The window element as claimed in claim 1, wherein the display is applied in the form of a flexible film flat display to at least one sheet element which is translucent and outputs light when the light-imaging means is switched on, and applied by adhesive bonding.

10. The window element as claimed in claim 1, wherein the active display in each case comprises one or more image-generating layers which are applied to a carrier layer, in particular sprayed on, vapor deposited, printed on or applied by other coating processes.

11. The window element as claimed in claim 10, wherein the carrier layer is a separate carrier layer or a layer that is already present, a glass layer of the window element.

12. The window element as claimed in claim 1, wherein the window element comprises at least one protective layer for covering the image-generating layer.

13. The window element as claimed in claim 1, wherein the window element comprises at least one intermediate layer which is switched over from a transparent state into an opaque or reflective state.

14. The window element as claimed in claim 1, wherein the window element comprises at least two image generating layers and at least one transparent intermediate layer which is arranged between them and is switched over into an opaque or reflective state.

15. The window element as claimed in claim 1, wherein the window element comprises at least one image generating layer and at least two transparent intermediate layers which are arranged on both sides of the image generating layer and is switched over into an opaque or reflective state.

16. The window element as claimed in claim 1, wherein a carrier layer used for an image-generating layer is a glass layer or acrylic glass layer which has an additional functional coating, a sunshade coating and/or coloration.

17. A facade, wall, ceiling, roof, dividing wall, staircase, door, elevator, railings, escalator or traveling pavement of a building, characterized in that this comprises at least one window element as claimed in claim 1.

18. A piece of furniture, municipal furniture or garden furniture, comprising at least one window element as claimed in claim 1.

* * * * *